United States Patent [19]
Tanaka et al.

[11] Patent Number: 5,349,293
[45] Date of Patent: Sep. 20, 1994

[54] CONDUCTIVE ROTATIONAL POSITION DETECTION DEVICE HAVING STATOR AND ROTOR

[75] Inventors: Shuichi Tanaka; Wataru Ichikawa, both of Tokyo, Japan

[73] Assignee: Kabushiki Kaisha SG, Tokyo, Japan

[21] Appl. No.: 934,960

[22] Filed: Aug. 25, 1992

[30] Foreign Application Priority Data

Aug. 27, 1991 [JP] Japan .................................. 3-238861

[51] Int. Cl.⁵ .............................................. G01B 7/30
[52] U.S. Cl. .......................... 324/207.16; 324/207.22; 324/207.25
[58] Field of Search ........... 324/173, 174, 175, 207.13, 324/207.14, 207.16, 207.17, 207.18, 207.19, 207.25, 207.22, 236, 239, 243

[56] References Cited

U.S. PATENT DOCUMENTS

| | | | |
|---|---|---|---|
| 3,297,940 | 1/1967 | Mulligan et al. | 324/173 X |
| 4,604,575 | 8/1986 | Shimizu et al. | |
| 4,612,503 | 9/1986 | Shimizu et al. | |
| 4,754,220 | 6/1988 | Shimizu et al. | |
| 4,851,770 | 7/1989 | Fiori, Jr. | 324/207.16 |
| 4,983,915 | 1/1991 | Rossi | 324/207.23 X |
| 5,025,213 | 6/1991 | Dobler et al. | 324/207.25 X |
| 5,083,084 | 1/1992 | Bauer et al. | 324/207.25 X |

*Primary Examiner*—Gerard R. Strecker
*Assistant Examiner*—Warren S. Edmonds
*Attorney, Agent, or Firm*—Graham & James

[57] ABSTRACT

Primary coils generate flux upon being excited by a predetermined ac signal. A stator is made in a plate-like configuration and has plural primary coils independently in the circumferential direction so that flux is generated by the primary coils in the direction of the axis of rotation. A rotor is provided displaceably relative to the primary coils to change reluctance with respect to the flux generated by the primary coils. Accordingly, as the rotor is rotated, reluctance change is produced due to the relative positional relation between the primary coils provided in the stator and the rotor. This reluctance change causes to change self-inductance of the primary coils and affects the exciting ac signal flowing through the primary coils and, therefore, by outputting the self-induced ac signal in the primary coils, the relative positional relation between the rotor and the primary coils, i.e., the rotational position of the rotor, can be detected.

9 Claims, 6 Drawing Sheets

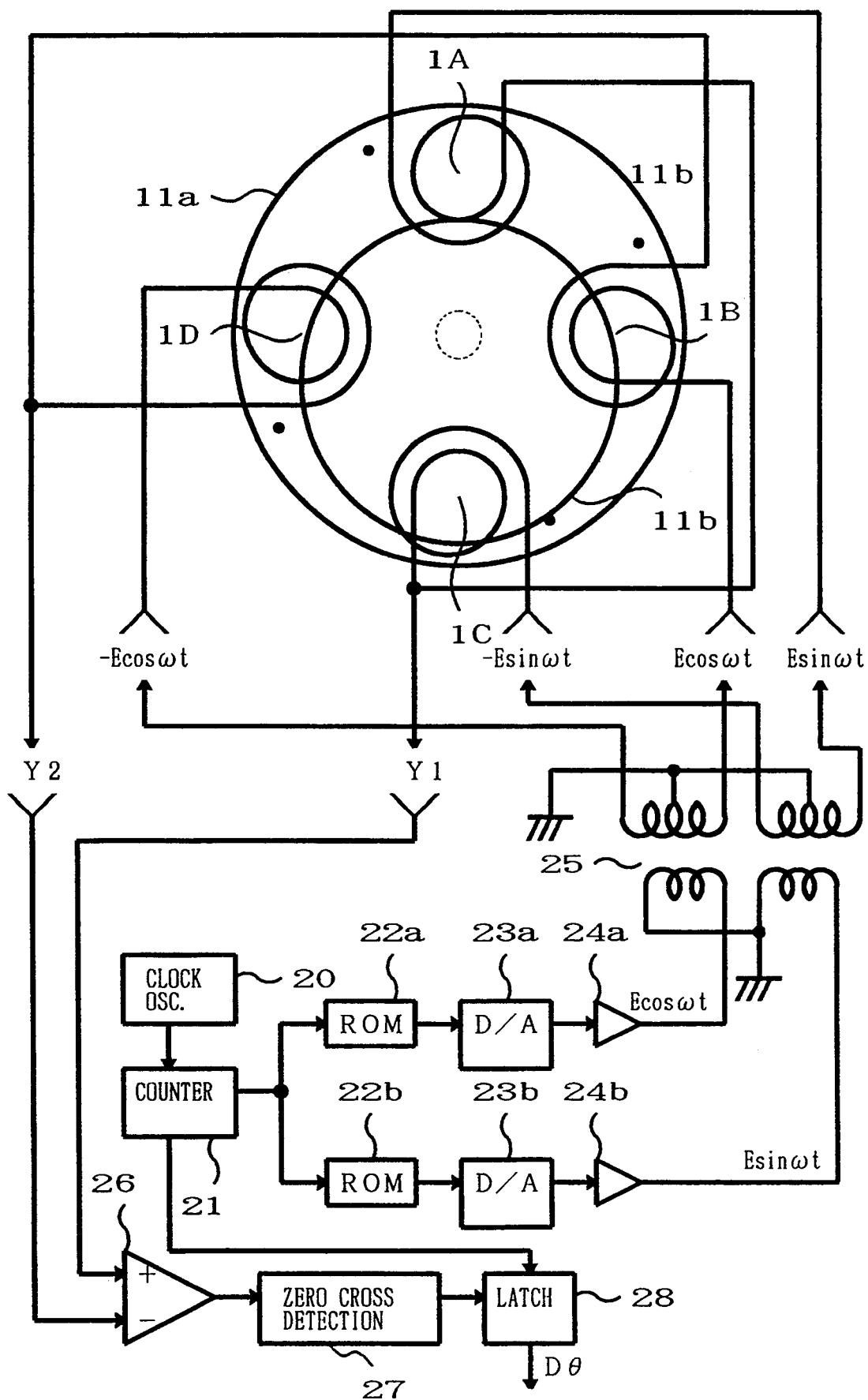
F I G. 2

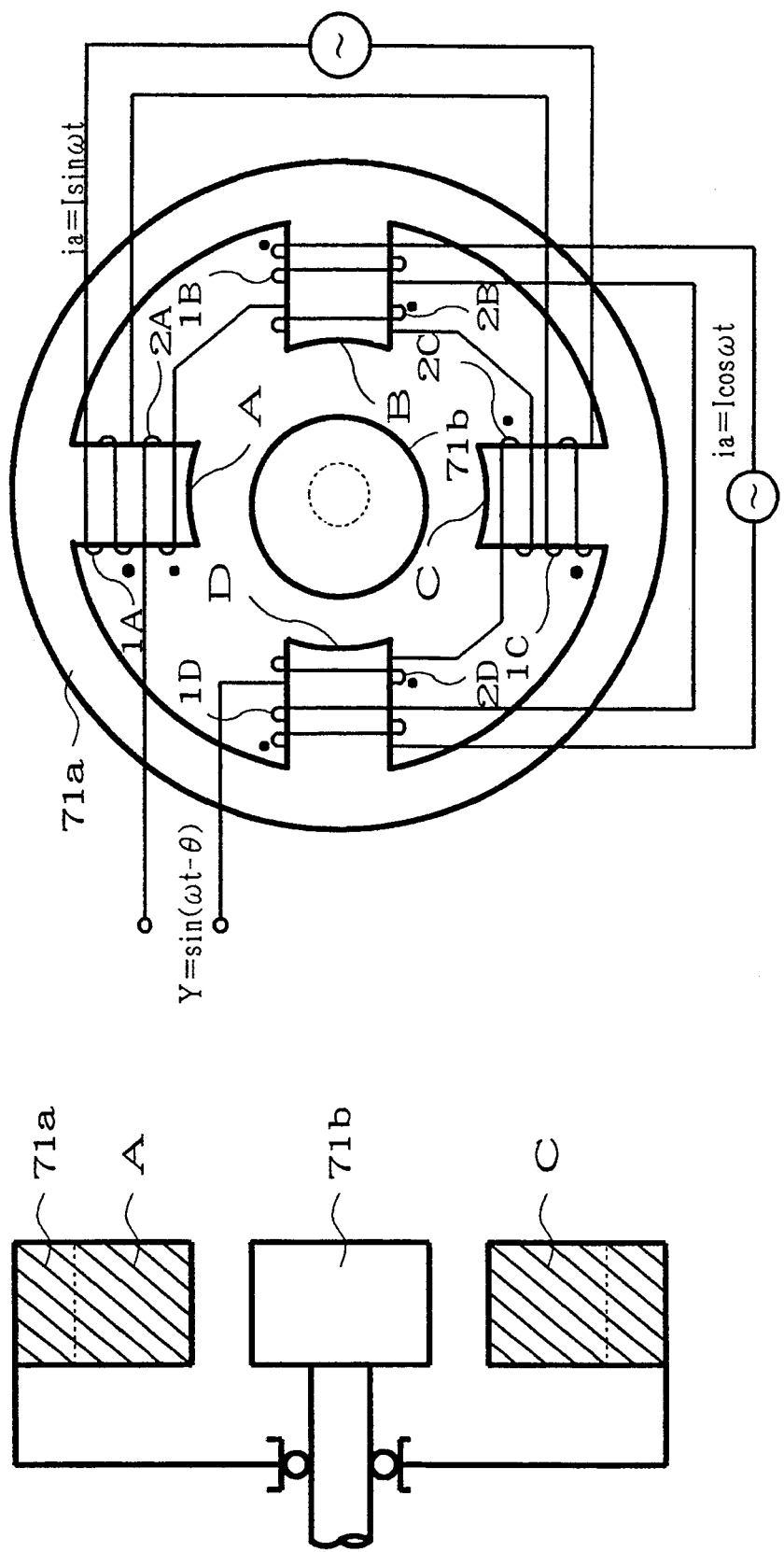

5,349,293

CONDUCTIVE ROTATIONAL POSITION DETECTION DEVICE HAVING STATOR AND ROTOR

BACKGROUND OF THE INVENTION

This invention relates to a rotational position detection device utilizing reluctance change and, more particularly, to a phase-shift type rotational position detection device detecting reluctance change in the form of change in an electrical phase angle of an output ac signal.

As a rotational position detection device utilizing reluctance change, there is a well known rotary type differential transformer called Microsin. This transformer which converts a rotational position to a voltage level has the disadvantage that it tends produce an error due to disturbance. In this transformer, there are disadvantages that, for example resistance of the coil changes due to change in the temperature with the result that the level of a detection signal change, the amount of attenuation in the level in a signal path from the detector to a circuit utilizing its detection signal differs depending upon the distance of signal transmission, and the variation in the level due to noise appears directly as a detection error.

The applicant has previously proposed a phase-shift type rotational position detection device capable of accurately detecting a rotational position without being affected by the variation in the output level due to disturbance or other causes (U.S. Pat. Nos. 4,604,575, 4,612,503, 4,754,220, Japanese Laid-open Patent Publication Nos. sho 57-60212, sho 57-88317, Japanese Patent Publication No. sho 62-58445 and others).

FIGS. 7a–8b schematically show the rotational position detection device previously proposed by the applicant. FIGS. 7a and 8a are front views of the rotational position detection device as viewed from the direction of the axis of rotation and FIGS. 7b and 8b are side views, partly in section, of the same device as viewed from the direction normal to the axis of rotation.

The rotational position detection device shown in FIGS. 7a and 7b includes a stator 71a having plural poles A–D projecting in the direction normal to the axis of rotation (i.e., in the direction of a normal line with respect to the axis of rotation) and being disposed at a predetermined interval (e.g., 90 degrees) in the circumferential direction, and a rotor 71b which is inserted in the space defined by the poles A–D of the stator 71a. In other words, the stator 71a is provided opposite to the outer peripheral surface of the rotor 71b.

The rotor 71b is made in a form and of a material which will change reluctance in each of the poles A–D, for example, a column which is eccentric to the axis of rotation. Primary coils 1A–1D and secondary coils 2A–2D are respectively wound about the poles A–D of the stator 71a. Coils are wound in such a manner that the first pair of the poles A and C and the second pair of the poles B and D respectively opposing each other pole in the pair across the rotor 71b act differentially and a differential reluctance change thereby is produced.

The primary coils 1A and 1C wound on the poles (A, C) of the first pair are excited by a sine wave signal $ia = I \sin \omega t$ and the primary coils 1B and 1C wound on the poles (B, D) of the second pair are excited by a cosine wave signal $ib = I \cos \omega t$. As a result, a composite signal Y of these signals is obtained from the secondary coils 2A–2D. This composite signal Y is a signal $Y = \sin(\omega t - \theta)$ which is phase shifted by an electrical phase angle corresponding to a rotation angle $\theta$ of the rotor 71b with respect to a primary ac signal (i.e., an exciting signal of the primary coils) $a = I \sin \omega t$ which constitutes a reference signal.

On the other hand, the rotational position detection device in FIGS. 8a and 8b includes plural poles A–D projecting in a direction parallel to the axis of rotation and disposed at a predetermined interval (e.g., 90 degrees) in the circumferential direction, a stator 81a having a pole E projecting at the axis of rotation, and a rotor 81b having a disc to one side of which the poles A–E oppose.

The rotor 81b is made in a form and of a material which will change reluctance of the poles A–D, for example, a disc which is eccentric to the axis of rotation. Primary coils 1A–1D are wound on the poles A–D of the stator 81a and a secondary coil 2E is wound on the pole E. The first pair of poles A and C and the second pair of poles B and D respectively opposing each other pole in the pair across the pole 2E are wound in such a manner that they act differentially and a differential reluctance change thereby is produced.

The primary coils 1A and 1C wound on the poles (A, C) of the first pair are excited by a sine wave signal $ia = I \sin \omega t$ in the same manner as in the device of FIG. 7 and the primary coils 1B and 1D wound on the poles (B, D) of the second pair are excited by a cosine wave signal $ib = I \cos \omega t$. As a result, a composite signal Y is obtained from the secondary coil E. This composite signal Y is a signal $Y = \sin(\omega t - \theta)$ which is phase shifted by an electrical phase angle corresponding to a primary ac signal (i.e., an exciting signal of the rotor 81b) $ia = I \sin \omega t$ or $ib = I \cos \omega t$) which constitutes a reference signal.

Since the rotational position detection device is an auxiliary part for controlling the operation of a machine tool and other industrial machines, a smaller type of rotational position detection device is desirable in respect of the area and capacity for installing it.

In the case of the rotational position detection device of FIGS. 7a and 7b, thickness of the stator 71a and the rotor 71b, i.e., the size in the direction of the axis of rotation, cannot be reduced because the surfaces of the coils face the axis of rotation. Since the stator 71a is provided in a manner to enclose the rotor 71b, reduction in the size of the rotational position detection device in the diametrical direction as well as in the direction of the axis of rotation is limited by the size and length in the direction of diameters of the rotor 71b and the stator 71a.

On the other hand, in the case of the rotational position detection device of FIGS. 8a and 8b, the stator 81a opposes to one surface of the rotor 81b and, therefore, the size of the device in the direction of the diameter can be reduced as compared with the device of FIGS. 7a and 7b by providing the stator 81a within the diameter of rotation of the rotor 81b. Since, however, the poles A–E of the stator 81a are projecting, there is a limit to reducing thickness of the device in the direction of the axis of rotation as compared with the device of FIGS. 7a and 7b.

SUMMARY OF THE INVENTION

It is, therefore, an object of the invention to provide a rotational position detection device capable of reducing the area and capacity for installing the device even when the device is assembled in a machine.

The rotational position detection device according to the invention comprises a stator of a generally plate-like shape, having a plurality of coils excitable by a predetermined ac signal, said plurality of coils being provided separately from one another in a circumferential direction of the orator so that a flux of each of the coils is generated in the direct ion of the axis rotation, a rotor of a generally plate-like shape, having such a configuration that it opposes said plurality of the coils, moves relative to said orator according to a rotational movement of an object to be detected and changes reluctance of magnetic paths formed by the flux generated by said coil means in accordance with a rotational position relative to said orator so as to induce from each of said coils an ac output signal corresponding to the reluctance, and output means for outputting a position detection signal representative of the rotational position on the basis of said ac output signals from said coils.

The coils generate flux upon being excited by a predetermined ac signal. The stator is made in a plate-like configuration and has the plural primary coils independently in the circumferential direction so that flux is generated by the coils in the direction of the axis of rotation. The rotor is provided displaceably relative to the coils to change reluctance to the flux generated by the coils. Accordingly, as the rotor is rotated, reluctance change is produced due to the relative positional relation between the coils provided in the stator and the rotor. This reluctance change causes to change self-inductance f the coils and affects an amplitude level of the exciting ac signal flowing through the coils and, therefore, by outputting the self-induced ac signal in the coils, the relative positional relation between the rotor and the primary coils, i.e., the rotational position of the rotor, can be detected. Since the provision of the secondary coils for detecting output signals in the stator as in the prior art device can be omitted, a film-like coil formed by providing cupper spirally on the stator surface can be used as the primary coils and, as a result, the thickness of the primary coils can be reduced to the order of millimeters whereby the rotational position detection device as a whole can be made thin and small.

Preferred embodiments of the invention will be described below with reference to the accompanying drawings.

BRIEF DESCRIPTION OF THE DRAWINGS

In the drawings,

FIG. 2 is an example of a position sensor conversion device connected to the rotational position detection device of FIG. 1;

FIG. 7a is a front view showing the basic structure of a prior art rotational position detection device and FIG. 7b is a side view thereof.

DESCRIPTION OF PREFERRED EMBODIMENTS

Figure 1A:
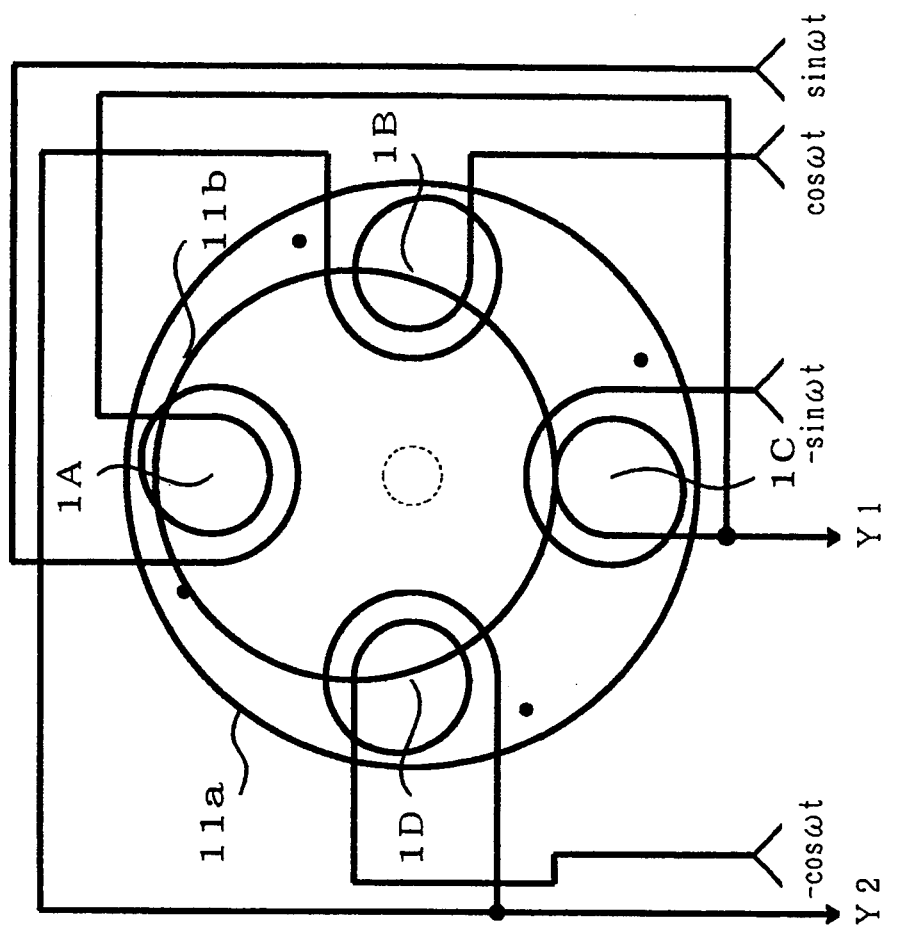
FIG. 1a is a front view of an embodiment of a rotational position detection device according to the invention and FIG. 1b is a side view thereof.
Figure 1B:
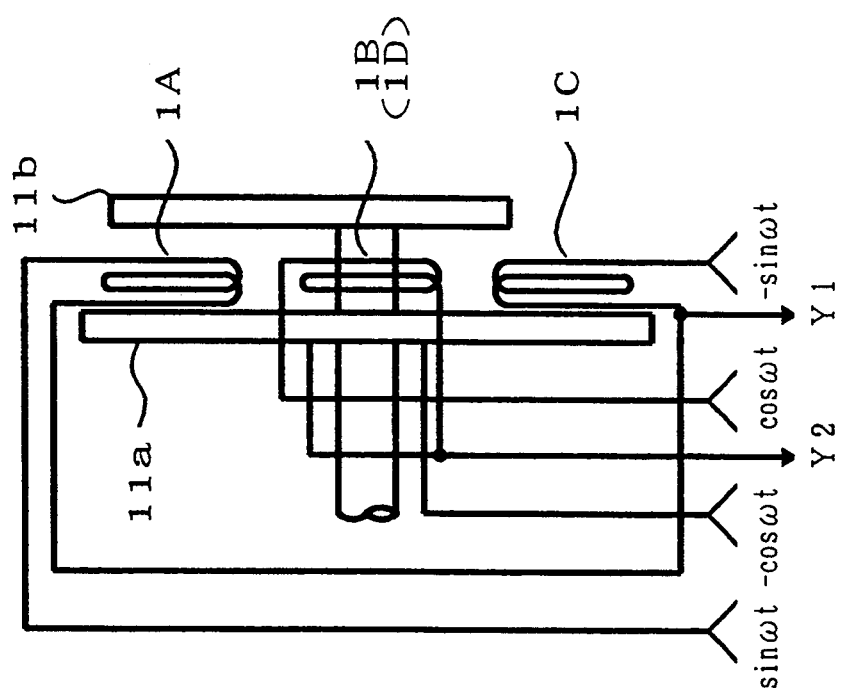

FIGS. 1a and 1b schematically show the basic structure of an embodiment of the rotational position detection device according to the invention. FIG. 1a is a front view of the rotational position detection device as viewed in the direction of the axis of rotation and FIG. 1b is a side view of the device as viewed in the direction normal to the axis of rotation.

The rotational position detection device of this embodiment is different from the prior art device in that the secondary coils provided in the rotational position detection device of FIGS. 7a–8b are omitted and that a signal $Y = \sin(\omega t - \theta)$ which is phase-shifted by an electrical phase angle corresponding to a rotation angle $\theta$ of a rotor 11b is derived from primary coil.

In the rotational position detection device of this embodiment, primary coils 1A–1D are provided on a stator 11a so that flux will be generated along the direction of the axis of rotation. The four primary coils 1A–1D are provided at an interval of about 90 degrees in the circumferential direction. Since secondary coils for detecting outputs are omitted in this embodiment, iron cores need not be provided for the primary coils and, as a result, film-like coils made of cupper and formed spirally on the surface of the stator 11a can be used as the primary coils 1A–1D, whereby the thickness of the primary coils can be reduced to the order of millimeter or below.

Figure 8A:
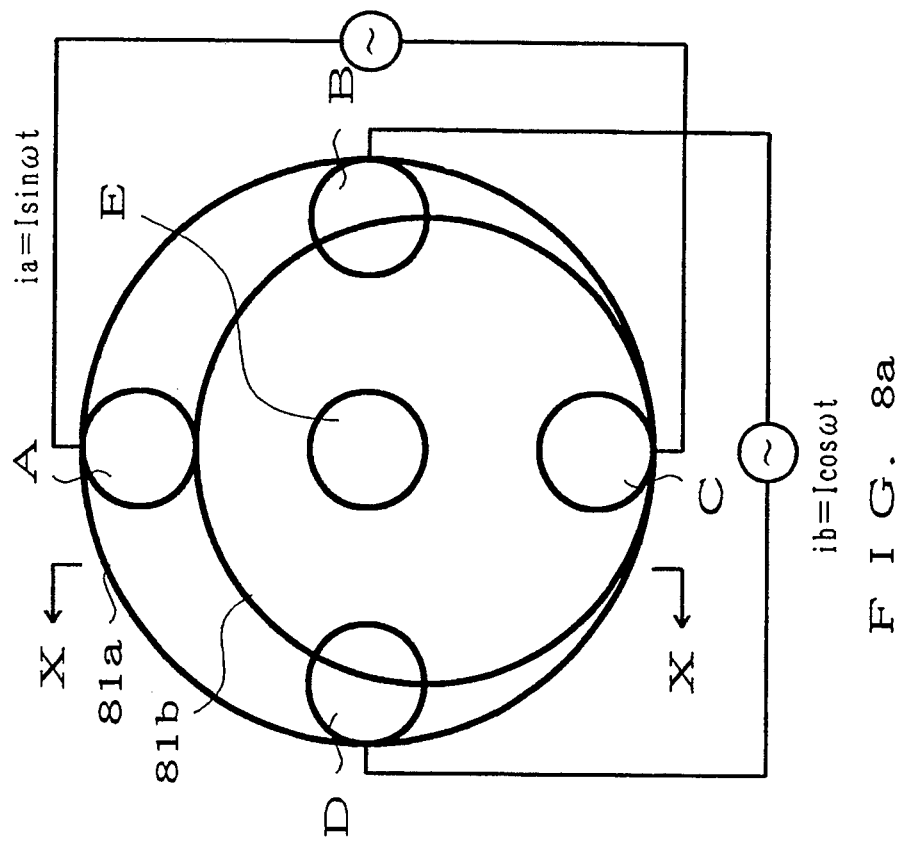
FIG. 8a is a front view showing the basic structure of another prior art rotational position detection device and FIG. 8b is a side view thereof.
Figure 8B:
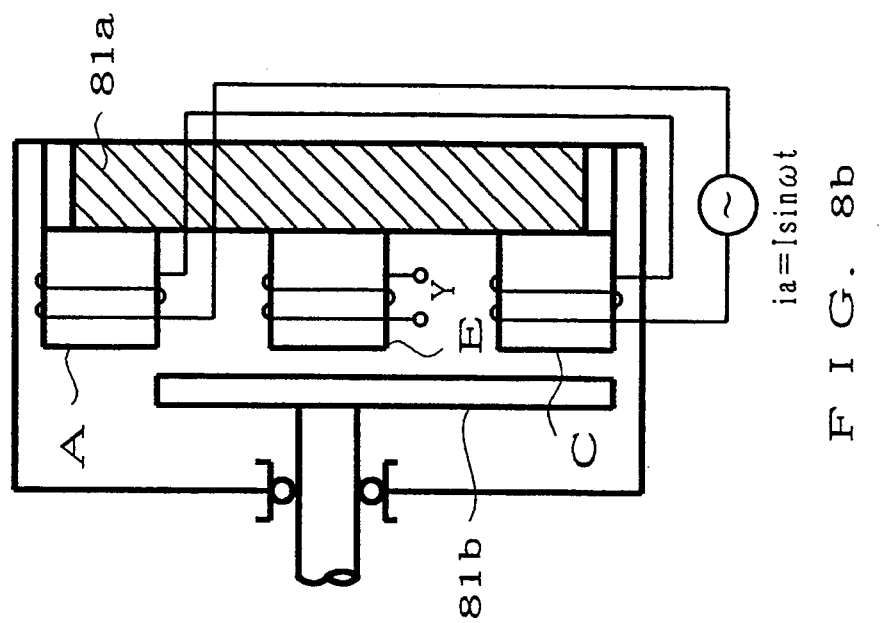

The rotor 11b is made in a shape and of a material which will cause reluctance of the respective primary coils 1A–1D to change in accordance with the rotation angle. The rotor 11b is constructed of a disc which, in the same manner as the rotor of FIG. 8, is eccentric to the axis of rotation. A first pair of the primary coils 1A and 1C and a second pair of the primary coils 1B and 1D respectively opposing each other across the axis of rotation are wound in a manner to act differentially and are constructed in a manner to produce a differential reluctance change with respect to each other in each pair.

As the rotor 11b, magnetic substance such as silicon steel sheet or conductive substance such as cupper sheet can be used. The cupper sheet generates an eddy current of a direction in which flux produced from the primary coils is cancelled and, therefore, has a function of producing reluctance change opposite to a case where magnetic substance such as silicon steel sheet is used. Detection efficiency can be improved by suitably combining silicon steel sheet and cupper sheet as the material of the rotor 11b as will be described more fully later.

The primary coil 1A constituting the first pair is excited by a sine wave signal $\sin \omega t$ and the primary coil 1C is excited by a sine wave signal $-\sin \omega t$. The primary coil 1B constituting the second pair is excited by a cosine wave signal $\cos t$ and the primary coil 1D is excited by a cosine wave signal $-\cos \omega t$. A first output Y1 is derived from an intermediate point of the primary coils 1A and 1C constituting the first pair and a second output Y2 from an intermediate point of the primary coils 1B and 1D constituting the second pair.

By picking up difference between the first output Y1 and the second output Y2 derived from the respective intermediate points, an output signal Y which is the same as the one derived in the prior art device can be obtained. This output signal Y is the output signal Y=sin ($\omega$t−$\theta$) which is phase-shifted with respect to a primary ac signal (i.e., the exciting signal for the primary coil) sin $\omega$t constituting a reference signal by an electrical phase angle corresponding to the rotation angle $\theta$ of the rotor 11b.

For detecting the rotation angle $\theta$ of the rotor 11b by using the above described rotational position detection device, it is necessary to provide a position sensor conversion device including a reference signal generation section generating primary ac signals sin $\omega$t, −sin $\omega$t, cos $\omega$t and −cos $\omega$t and a phase difference detection section measuring an electrical phase difference $\theta$ of the composite output signal Y and thereby calculating position data of the rotor 11b. The structure of this rotational position detection device will be described below.

FIG. 2 shows an example of a position sensor conversion device connected to the rotational position detection device of FIG. 1. In FIG. 2, the position sensor conversion device includes a reference signal generation section which generates reference ac signals sin $\omega$t, −sin $\omega$t, cos $\omega$t and −cos $\omega$t and a phase detection section which detects phase difference (the amount of phase difference) between the reference ac signal sin $\omega$t and the output signal Y.

The reference signal section includes a clock oscillator 20, a synchronizing counter 21, ROMs 22a and 22b, D/A converters 23a and 23b, amplifiers 24a and 24b and a transformer 25. The phase difference detection section includes an amplifier 26, a zero cross circuit 27 and a latch circuit 28.

The clock oscillator 20 generates a high-speed and accurate clock signal and the other circuits are operated in response to this clock signal.

The synchronizing counter 21 counts the clock signal generated by the clock oscillator 20 and outputs its count as an address signal to the ROM 22a and the latch circuit 27 of the phase difference detection section.

The ROMs 22a and 22b store amplitude data corresponding to the reference ac signal and produce amplitude data of the reference ac signal in response to the address signal (count) from the synchronizing counter 21. The ROM 22a stores amplitude data of cos $\omega$t and the ROM 22b stores amplitude data of sin $\omega$t. The ROMs 22a and 22b, therefore, produce two different reference ac signals sin $\omega$t and cos $\omega$t by receiving the same address signal from the synchronizing counter 21. Two different reference ac signals can be also obtained by accessing ROMs storing the same amplitude data by address signals having different phases from each other.

The D/A converters 23a and 23b convert digital amplitude data from the ROMs 22a and 22b to analog signals and supply the converted signals to the amplifiers 24a and 24b. The amplifiers 24a and 24b amplify the analog signals from the D/A converters 23a and 23b and apply them to the primary side of the transformer 25 as the reference ac signals sin $\omega$t and cos $\omega$t. Since an intermediate tap on the secondary side of the transformer 25 is grounded, reference ac signals Esin $\omega$t, −Esin $\omega$t, Ecos $\omega$t and −Ecos $\omega$t are provided from the secondary side of the transformer 25. Assuming that the frequency number of the synchronizing counter 21 is M, M counts of the synchronizing counter 21 corresponds to the maximum phase angle 2 radian (360 degrees) of the reference ac signals. That is, one count of the synchronizing counter 21 represents a phase angle of $2\pi/M$ radian.

A differential amplifier 26 amplifies the difference between the first output Y1 derived from the intermediate point between the primary coils 1A and 1C and the second output Y2 derived from the intermediate point between the primary coils 1B and 1D and supplies the amplified signal to the zero cross circuit 27.

The zero cross circuit 27 detects a zero crossing point from a negative voltage to a positive voltage in response to the output signal Y from the difference amplifier 26 and supplies a detection signal to the latch circuit 28.

The latch circuit 28 latches a count of the synchronizing counter 21 which has started with a clock signal at rising of the reference ac signal at a time point of outputting of the detection signal from the zero cross detection circuit 27 (i.e., zero crossing point). The value latched by the latch circuit 28 constitutes the phase difference (the amount of phase difference) D between the reference ac signal and the output signal Y.

The output signal Y=sin ($\omega$t−$\theta$) from the differential amplifier 26 is supplied to the zero cross circuit 27. The zero cross circuit 27 produces a pulse L with the electrical phase angle of the output signal Y being in synchronization with the timing of zero. The pulse L is used as a latch pulse for the latch circuit 28. The latch circuit 28 therefore latches a count of the synchronizing counter 21 in response to rising of the pulse L. A cycle during which the count of the synchronizing counter 21 completes one circulation is caused to synchronize with one cycle of the sine wave signal sin $\omega$t. As a result, a count corresponding to phase difference $\theta$ between the reference ac signal sin $\omega$t and the composite output signal Y=sin ($\omega$t−$\theta$) is latched in the latch circuit 28. The latched value therefore is provided as the position data D$\theta$. The latch pulse L can also be used suitably as a timing pulse.

A process in which the output signal Y becomes sin ($\omega$t−$\theta$) will now be described.

First, a constant voltage signal is applied from the reference signal generation section to the primary coils 1A-1D. In the figure, a sine wave voltage signal ea=Esin$\omega$t is applied to the primary coil 1A, a cosine wave voltage signal eb=Ecos $\omega$t to the primary coil 1B, a sine wave voltage signal ec=−Esin $\omega$t to the primary coil 1C and a cosine wave voltage signal ed=−Ecos $\omega$t to the primary coil 1D.

The primary coils 1A and 1C are wound in a manner to produce flux in opposite directions to each other. More specifically, the primary coils 1A and 1C are wound in such a manner that when flux is produced in the primary coil 1A in the forward direction in the figure (from the stator 11a toward the rotor 11b) by applying the sine wave voltage signal ea=Esin $\omega$t to the primary coil 1A, flux is produced in the primary coil 1C in the rearward direction in the figure (from the rotor 11b toward the stator 11a). The primary coils 1B and 1D are wound in a similar manner.

The rotor 11b is opposed to the primary coils 1A–1D with a predetermined gap therebetween and is rotated in accordance with the rotation of a rotary shaft. The rotation angle $\theta$ which is the object of detection is given to this rotary shaft. The rotor 11b is of a shape which causes its area opposing the respective primary coils 1A-1D to be changed in accordance with the rotation angle $\theta$. In this embodiment, the rotor 11b is made of a disc secured eccentrically to the rotary shaft.

By changing of the area of the disc of the rotor 11b opposing the respective primary coils 1A-1D, reluctance of the magnetic path through the primary coils 1A-1D changes which in turn causes change in impedance (inductance) La, Lb, Lc and Ld of the respective primary coils 1A-1D. By suitably selecting the mechanical size and shape of the stator 11a and the rotor 11b, the impedance change in the respective primary coils 1A-1D can be caused to comply with the following trigonometric functions:

$$1/La = (1/L) \cdot (1 + k\cos\theta)$$

$$1/Lb = (1/L) \cdot (1 + k\sin\theta)$$

$$1/Lc = (1/L) \cdot (1 + k\cos\theta)$$

$$1/Ld = (1/L) \cdot (1 + k\sin\theta)$$

In the above equations, L and k are constants which are determined by the structures of the stator 11a and the rotor 11b and the frequency ($\omega/2\pi$) of the exciting signal. In the above equations, the rotation angle $\theta$ is made zero when the area of the rotor 11b opposing the primary coil 1A is minimum as shown in FIG. 2.

Since the signals ea to ed applied to the respective primary coils 1A-1D are of a constant voltage, currents 1a to 1d which are in inverse proportion to the impedance change in the respective primary coils 1A-1D flow through the primary coils 1A-1D. These currents 1a to 1d are expressed by the following equations:

$$ia = ea/La = (E\sin\omega t)(1/L)(1 + k\cos\theta)$$

$$ib = eb/La = (E\cos\omega t)(1/L)(1 + k\sin\theta)$$

$$ic = ec/La = (-E\sin\omega t)(1/L)(1 - k\cos\theta)$$

$$id = ec/Ld = (-E\cos\omega t)(1/L)(1 - k\sin\theta)$$

Accordingly, the first output Y1 derived from the intermediate point between the primary coils 1A and 1C and the second output Y2 derived from the intermediate point between the primary coils 1B and 1D are expressed by the following equations:

$$Y1 = 1a + 1c = (2kE/L)\sin\omega t\cos\theta$$

$$Y2 = 1b + 1d = (2kE/L)\cos\omega t\sin\theta$$

The output signal Y provided by the differential amplifier 26 is expressed by the following equation:

$$Y = (2kE/L)(\sin\omega t\cos\theta - \cos\omega t\sin\theta)$$

This equation can be modified to the following equation on the basis of the addition theorem trigonometric function, i.e., $\sin(\alpha - \beta) = \sin\alpha\cos\beta - \cos\alpha\sin\beta$:

$$Y = (2kE/L)\sin(\omega t - \theta)$$

As will be apparent from this equation, the output signal Y provided by the differential amplifier 26 is an ac signal which is different in phase from the reference ac signal sin $\omega t$ by a phase angle corresponding to the rotation angle $\theta$. Accordingly, by detecting the phase difference between this output signal Y and the reference ac signal sin $\omega t$, the rotation angle $\theta$ can be obtained.

Figure 3:
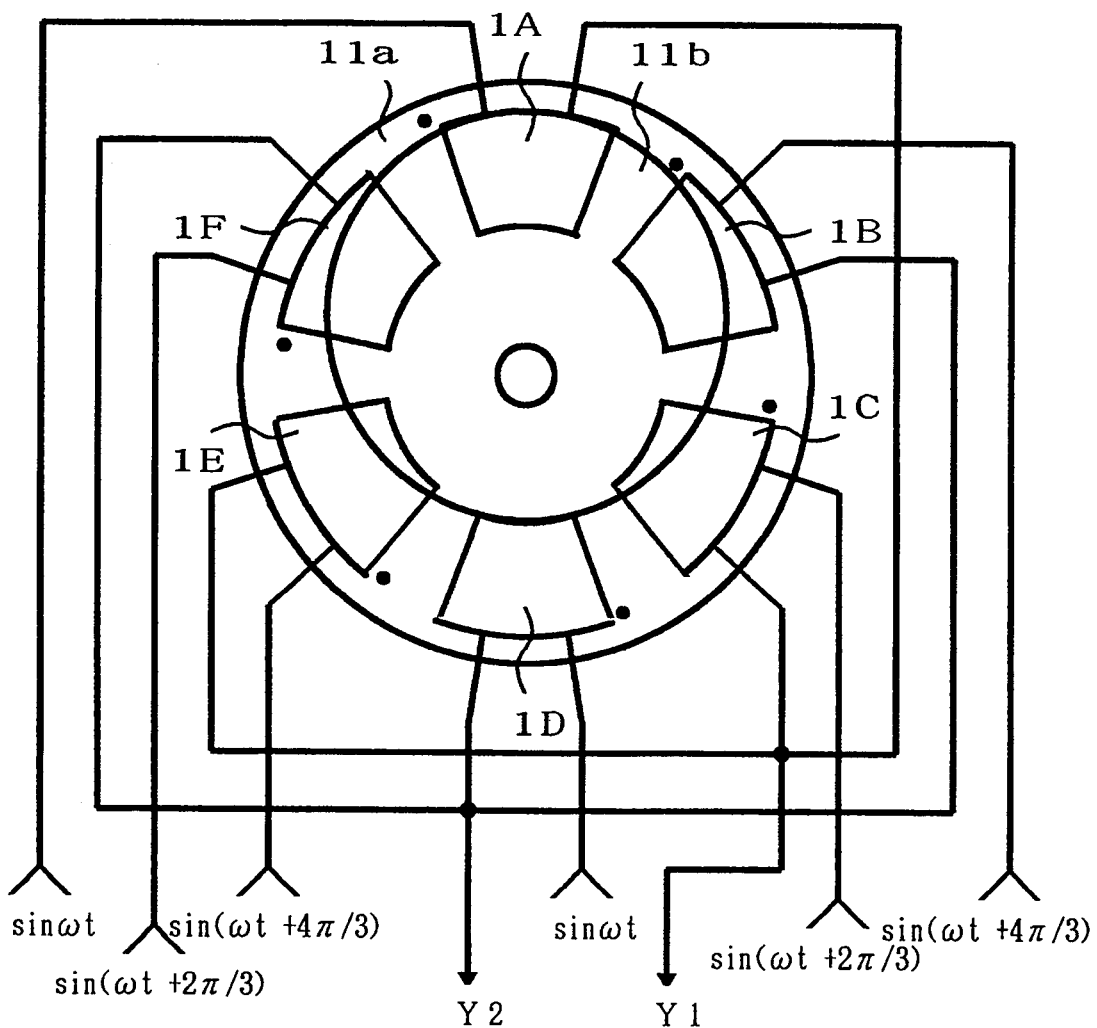
FIG. 3 is a front view of another embodiment of the rotational position detection device according to the invention.

FIG. 3 shows another embodiment of the invention. In FIG. 3, the same component parts as those in FIG. 1 are designated by the same reference characters and description thereof will be omitted. The rotational position detection device of this embodiment is different from the one shown in FIG. 1 in that six primary coils 1A-1F for generating flux in the direction of the axis of rotation are provided at an interval of about 60 degrees in the circumferential direction and the primary coils 1A-1F are respectively excited by three-phase ac signals sin$\omega t$, sin ($\omega t + 2\pi/3$), sin ($\omega t + 4\pi/3$).

The primary coils 1A and 1D opposing each other across the axis of rotation are excited by sin $\omega t$, the primary coils 1B and 1E by sin ($\omega t + 2\pi/3$), and the primary coils 1C and 1F by sin ($\omega t + 4\pi/3$). These coils are wound in a manner to act differentially and are constructed in a manner to produce differential reluctance change. The primary coils 1A, 1C and 1E are connected in star-connection and a first output Y1 is derived from an intermediate point of this connection. Likewise, the primary coils 1B, 1D and 1F are connected in star-connection and a second output Y2 is derived from an intermediate point of this connection.

By picking up difference between the first and second outputs Y1 and Y2 derived from these intermediate points, an output signal Y similar to the one obtained in the embodiment of FIG. 1 can be obtained. This output signal Y is an output signal Y=sin ($\omega t - 0$) which is phase shifted with respected to a primary ac signal constituting a reference signal (i.e., the exciting signal for the primary coil 1A) sin $\omega t$ by an electrical phase angle corresponding to the rotation angle $\theta$.

By adopting the six-pole construction of the primary coils 1A-6A as shown in FIG. 3, there arises the advantage that a permeance error caused by a triple wave component produced due to the structure between the stator 11a and the rotor 11b can be eliminated (see the specification of Japanese Laid-open Utility Model Publication No. Sho 59-161023).

FIGS. 4a-6b show modified examples of the shape of the rotor adaptable to the device according to the invention.

In the embodiments of FIGS. 1a, 1b and 3, description has been made about the case where the rotor 11b is made of a single kind of material, e.g., magnetic substance such as silicon steel sheet or non-magnetic substance such as cupper sheet. However, by suitably combining both materials as shown in FIGS. 4a-6b, the detection efficiency, i.e., the amplitude value of the output signal Y, can be increased.

Figures 4A, 4B:
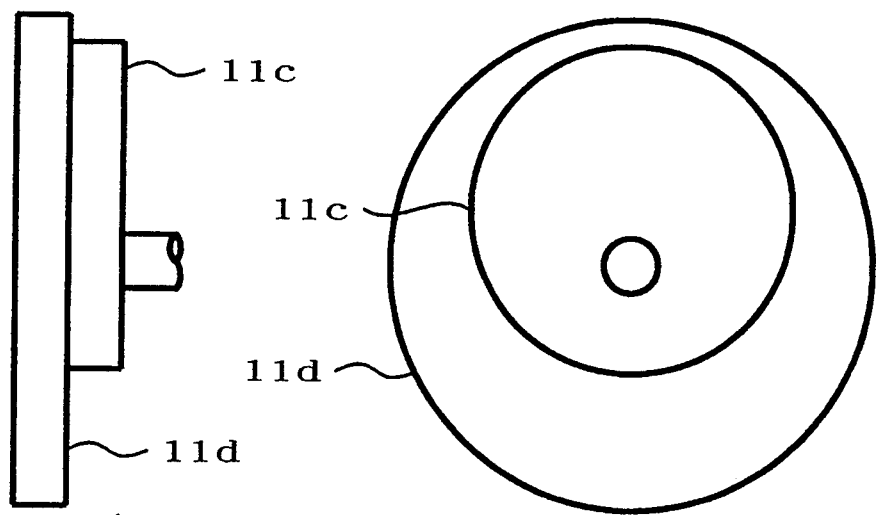
FIG. 4a is a front view of a modified example of the configuration of the rotor adaptable to the invention and FIG. 4b is a side view thereof.

In the rotor of FIGS. 4a and 4b, one of two discs, one being made of magnetic substance and the other of conductive substance, is provided at a position which is eccentric to the rotary shaft and the other is provided concentrically with the rotary shaft. More specifically, in the rotor of FIGS. 4a and 4b, a disc 11c is made of silicon steel sheet and a disc 11d of cupper sheet, or the disc 11c is made of cupper sheet and the disc 11d of silicon steel sheet.

Figures 5A, 5B:
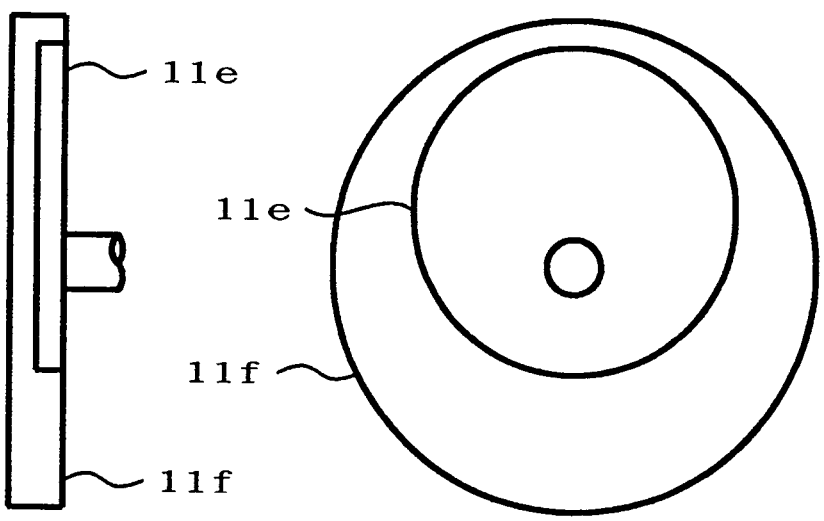
FIG. 5a is a front view of another modified example of the configuration of the rotor adaptable to the invention and FIG. 5b is a side view thereof.

In the rotor of FIGS. 5a and 5b, magnetic substance and conductive substance are made integral to form a single disc. More specifically, in the rotor of FIGS. 5a and 5b, a disc 11f is made of silicon steel sheet and a disc 11e made of cupper sheet is inserted in the disc 11f, or the disc 11f is made of cupper sheet and the disc 11e made of silicon steel sheet is inserted in the disc 11f. In the examples of FIGS. 4a–5b, the discs 11c and 11f are provided on the primary coil side. Alternatively, the disc 11d and 11f may be provided on the primary coil side.

Figures 6A, 6B:
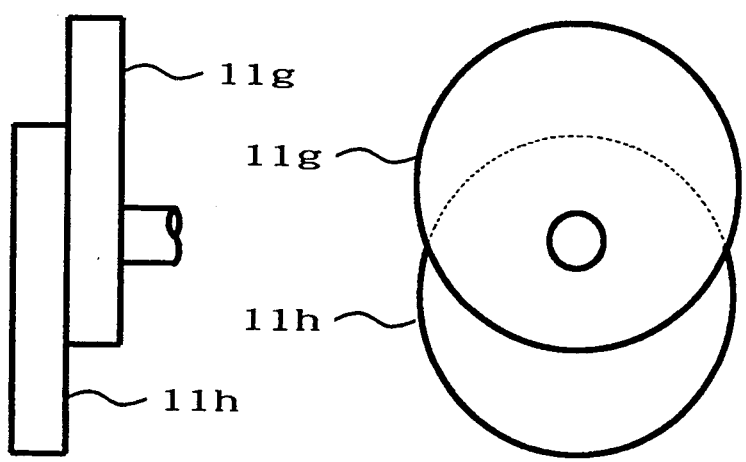
FIG. 6a is a front view of still another modified example of the configuration of the rotor adaptable to the invention and FIG. 6b is a side view thereof.

In the rotor of FIGS. 6a and 6b, two discs, one being made of magnetic substance and the other of conductive substance, are provided at positions which are respectively eccentric to the rotary shaft with the eccentric positions being at point symmetry with respect to the axis of rotation. In the rotor of FIGS. 6a and 6b, a disc 11g is made of silicon steel sheet and a disc 11h of cupper sheet, or the disc 11g is made of cupper sheet and the disc 11h of silicon steel sheet.

By constructing the rotor as shown in FIGS. 4a–6b, the primary coil which is in contact with silicon steel sheet has the smallest reluctance effect whereas the primary coil which is in contact with cupper sheet has the largest reluctance effect due to the eddy current loss, so that an output signal having about double detection efficiency can be obtained.

In the above described embodiments, description has been made as using a disc as the rotor. The rotor is not limited to this shape but it may be of any shape, if the rotor can cause a sinusoidal reluctance change with respect to the primary coils. For example, the rotor may be of an elliptical, sinusoidal or geer wheel shape. Further, these various shapes may be suitably combined in a manner as shown in FIGS. 4a–6b.

In the above described embodiments, the primary coils have been described as being hollow. If, however, they have a certain thickness, an iron core may be inserted therein.

In the above described embodiments, the primary coils have been described as being 4 poles or 6 poles. The invention is not limited to this but the rotational position of the rotor can be detected if the rotor has three or more poles.

According to the invention, the size of the rotational position detection device in the direction of the axis of rotation and the direction vertical to the axis of rotation can be reduced and, accordingly, the area and capacity for providing the entire rotational position detection device can also be reduced whereby the rotational position detection device can be assembled readily into a machine or equipment.

What is claimed is:

1. A rotational position detection device comprising:
   stator means of a generally plate-like shape, having a plurality of coil means excitable by a predetermined ac signal, said plurality of coil means being provided separately from one another in a circumferential direction of the stator means so that a flux of each of the coil means is generated in the direction of the axis of rotation;
   rotor means of a generally plate-like shape, having such a configuration that it opposed said plurality of the coil means, moves relative to said stator means according to a rotational movement of an object to be detected and changes reluctance of magnetic paths formed by the flux generated by said coil means in accordance with a rotational position relative to said stator means so as to induce from each of said coil means an ac output signal corresponding to the reluctance wherein said rotor means comprises a disc made of magnetic substance which is disposed eccentrically with respect to the axis of rotation; and
   output means for outputting a position detection signal representative of the rotational position on the basis of said ac output signals from said coil means.

2. A rotational position detection device as defined in claim 1 wherein said coil means is made of film-like coils formed by providing conductors spirally on the surface of said stator means.

3. A rotational position detection device as defined in claim 1 wherein said plurality of the coil means are respectively excited by at least two reference ac signals which are out of phase each other, and
   said output means compromises first means for summing up said ac output signals from said coil means to produce a summed output signal which has been phase-shifted by an electric phase angle corresponding to said rotational position and second means for detecting an amount of the phase-shift in the summed output signal to produce the position detection signal representative of the rotational position on the basis of the detected amount.

4. A rotational position detection device comprising:
   stator means of a generally plate-like shape, having a plurality of coil means excitable by a predetermined ac signal, said plurality of coil means being provided separately from one another in a circumferential direction of the stator means so that a flux of each of the coil means is generated in the direction of the axis of rotation;
   rotor means of a generally plate-like shape, having such a configuration that it opposes said plurality of the coil means, moves relative to said stator means according to a rotational movement of an object to be detected and changes reluctance of magnetic paths formed by the flux generated by said coil means in accordance with a rotational position relative to said stator means so as to induce from each of said coil means an ac output signal corresponding to the reluctance wherein said rotor means comprises a disc made of conductive substance which disc is disposed concentrically with respect to the axis of rotation; and
   output means for outputting a position detection signal representative of the rotational position on the basis of said ac output signals from said coil means.

5. A rotational position detection device comprising:
   stator means of a generally plate-like shape, having a plurality of coil means excitable by a predetermined ac signal, said plurality of coil means being provided separately from one another in a circumferential direction of the stator means so that a flux of each of the coil means is generated in the direction of the axis of rotation;
   rotor means of a generally plate-like shape, having such a configuration that it opposes said plurality of the coil means, moves relative to said stator means according to a rotational movement of an object to be detected and changes reluctance of magnetic paths formed by the flux generated by said coil means in accordance with a rotational position relative to said stator means so as to induce from each of said coil means an ac output signal corresponding to the reluctance wherein said rotor means is constructed of two discs made of magnetic substance and conductive substance respectively, one of said two discs being provided eccentrically with respect to the axis of rotation and the other being concentric with the axis of rotation output means for outputting a position detection signal representative of the rotational position on the basis of said ac output signals from said coil means.

6. A rotational position detection device comprising:

stator means of a generally plate-like shape, having a plurality of coil means excitable by a predetermined ac signal, said plurality of coil means being provided separately from one another in a circumferential direction of the stator means so that a flux of each of the coil means is generated in the direction of the axis of rotation;

rotor means of a generally plate-like shape, having such a configuration that it opposed said plurality of the coil means, moves relative to said stator means according to a rotational movement of an object to be detected and changes reluctance of magnetic paths formed by the flux generated by said coil means in accordance with a rotational position relative to said stator means so as to induce from each of said coil means an ac output signal corresponding to the reluctance wherein said rotor means is constructed of two discs made of magnetic substance and conductive substance respectively, the center of said two discs being provided eccentrically with respect to the axis of rotation at point symmetry to each other; and output means for outputting a position detection signal representative of the rotational position on the basis of said ac output signals from said coil means.

7. A rotational position detection device as defined in claim 6 wherein said coil means is made of film-like coils formed by providing conductors spirally on the surface of said stator means.

8. A rotational detection device as defined in claim 6 wherein said plurality of the coil means are respectively excited by at least two reference ac signals which are out of phase each other, and said output means compromises first means for summing up said ac output signals from said coil means to produce a summed output signal which has been phase-shifted by an electric phase angle corresponding to said rotational position and second means for detecting an amount of the phase-shift in the summed output signal to produce the position detection signal representative of the rotational position on the basis of the detected amount.

9. A rotational position detection device comprising:

stator means of a generally plate-like shape, having a plurality of coil means excitable by a predetermined ac signal, said plurality of coil means being provided separately from one another in a circumferential direction of the stator means so that a flux of each of the coil means is generated in the direction of the axis of rotation;

rotor means of a generally plate-like shape, having such a configuration that it opposed said plurality of the coil means, moves relative to said stator means according to a rotational movement of an object to be detected and changes reluctance of magnetic paths formed by the flux generated by said coil means in accordance with a rotational position relative to said stator means so as to induce from each of said coil means an ac output signal corresponding to the reluctance; and output means for outputting a position detection signal representative of the rotational position on the basis of said ac output signals from said coil means, wherein said rotor means is constructed of a disc made of magnetic substance which is disposed eccentrically with respect to the axis of rotation; and wherein said plurality of the coil means are respectively excited by at least two reference ac signals which are out of phase with each other, and said output means compromises first means for summing up said ac output signals from said coil means to produce a summed output signal which has been phase-shifted by an electric phase angle corresponding to said rotational position and second means for detecting an amount of the phase-shift in the summed output signal to produce the position detection signal representative of the rotational position on the basis of the detected amount.

* * * * *